United States Patent
Suh et al.

(10) Patent No.: US 12,159,033 B2
(45) Date of Patent: Dec. 3, 2024

(54) METADATA REGISTERS FOR A MEMORY DEVICE

(71) Applicant: QUALCOMM Incorporated, San Diego, CA (US)

(72) Inventors: Jungwon Suh, San Diego, CA (US); Pankaj Deshmukh, San Diego, CA (US); Michael Hawjing Lo, San Diego, CA (US); Subbarao Palacharla, San Diego, CA (US); Olivier Alavoine, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 18/047,493

(22) Filed: Oct. 18, 2022

(65) Prior Publication Data
US 2024/0126438 A1    Apr. 18, 2024

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2011/0084978 A1* | 4/2011 | Schuette | G06F 13/1668 345/530 |
| 2013/0019051 A1 | 1/2013 | Somanache et al. | |
| 2018/0060171 A1* | 3/2018 | Suh | G06F 3/0619 |
| 2019/0004975 A1* | 1/2019 | Benisty | G06F 12/0246 |
| 2020/0098442 A1* | 3/2020 | Yuan | G06F 11/0772 |
| 2020/0401508 A1* | 12/2020 | Hsu | G06F 3/0679 |
| 2021/0064461 A1 | 3/2021 | Veches | |
| 2021/0064463 A1 | 3/2021 | Suh et al. | |
| 2021/0081127 A1 | 3/2021 | Xiao et al. | |
| 2021/0208967 A1 | 7/2021 | Cha et al. | |
| 2021/0358559 A1 | 11/2021 | Suh et al. | |
| 2022/0187996 A1* | 6/2022 | Kim | G06F 3/0653 |
| 2022/0206713 A1* | 6/2022 | Kim | G06F 12/10 |
| 2022/0357886 A1* | 11/2022 | Pitchumani | G06F 3/0659 |
| 2023/0229348 A1* | 7/2023 | Ayyapureddi | G06F 3/0604 711/154 |

OTHER PUBLICATIONS

International Search Report and Written Opinion—PCT/US2023/074209—ISA/EPO—Dec. 15, 2023.

* cited by examiner

*Primary Examiner* — Kaushikkumar M Patel
(74) *Attorney, Agent, or Firm* — NORTON ROSE FULBRIGHT US LLP/Qualcomm

(57) ABSTRACT

This disclosure provides systems, methods, and devices for memory systems that support metadata. In a first aspect, a method of handling data and metadata at a memory device includes receiving data from the host via the at least one data connection into the first plurality of registers; receiving metadata from the host via the at least one non-data connection into the second plurality of registers; storing the data in the first portion of the memory array; and storing the metadata in the second portion of the memory array. Other aspects and features are also claimed and described.

49 Claims, 14 Drawing Sheets

METADATA REGISTERS FOR A MEMORY DEVICE

TECHNICAL FIELD

Aspects of the present disclosure relate generally to computer information systems, and more particularly, to memory systems for storing data. Some features may enable and provide improved memory capabilities for storing metadata such as error correction codes (ECCs) for data stored in memory.

INTRODUCTION

A computing device (e.g., a laptop, a mobile phone, etc.) may include one or several processors to perform various computing functions, such as telephony, wireless data access, and camera/video function, etc. A memory is an important component of the computing device. The processors may be coupled to the memory to perform the aforementioned computing functions. For example, the processors may fetch instructions from the memory to perform the computing function and/or to store within the memory temporary data for processing these computing functions, etc.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An apparatus in accordance with at least one embodiment includes a memory configured to communicate with a host. The memory includes a memory array configured to store data. The memory is configured to provide the data stored in the memory array to the host in performing computing functions. In some aspects, registers of a memory device may be configured to separately store data and metadata in different sets of registers. The metadata registers may temporarily store information during transmission between a host device and a memory device for retrieval from a memory array of the memory device in response to a read command or storage in the memory array of the memory device in response to a write command.

In one aspect of the disclosure, a memory device includes a memory array comprising a first portion and a second portion; and a memory input/output (I/O) module. The memory I/O module may be coupled to the memory array, configured to communicate with a host through a channel comprising a plurality of connections including at least one data connection and at least one non-data connection, and comprised of at least one first register and at least one second register. The memory I/O module may be configured to perform operations including receiving data from the host via the at least one data connection into the at least one first register; receiving metadata from the host via the at least one non-data connection into the at least one second register; storing the data in the first portion of the memory array; and storing the metadata in the second portion of the memory array. The memory I/O module may also be configured to perform operations including retrieving data from the first portion of the memory array into the at least one first register; retrieving metadata from the second portion of the memory array into the at least one second register; transmitting the data to the host via the at least one data connection from the at least one first register; and transmitting the metadata to the host via the at least one non-data connection from the at least one second register.

In an additional aspect of the disclosure, an apparatus, such as a wireless device, includes at least one processor and a memory coupled to the at least one processor. The at least one processor is configured to communicate with the memory through a memory controller coupled to a channel that couples the processor to the memory. The processor may be a processor, controller, or other logic circuitry in a host.

In an additional aspect of the disclosure, a non-transitory computer-readable medium stores instructions that, when executed by a processor, cause the processor to perform operations described herein regarding aspects of the disclosure.

The term error-correcting code or codes (ECC or ECCs) in the present disclosure may refer to error detection, error correcting, or error detection and correcting codes. The ECCs are not be limited to a particular type of coding. In some examples, the ECCs may include Hamming codes and/or parity codes.

Memories in the present disclosure may be embedded within a processor on a semiconductor die or be part of a different semiconductor die. The memories may be of various kinds. For example, the memory may be static random access memory (SRAM), dynamic random access memory (DRAM), magnetic random access memory (MRAM), NAND flash, or NOR flash, etc.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). One such LPDDR specification may be LPDDR5. Another such LPDDR specification may be LPDDR6.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections. The processor may be coupled to the first network adaptor and a memory for storing data to support the processing and communications operations performed by the processor. The network adaptor may support communication over a wireless communications network such as a 5G NR communication network. The processor may cause the transmission of data stored in memory over the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
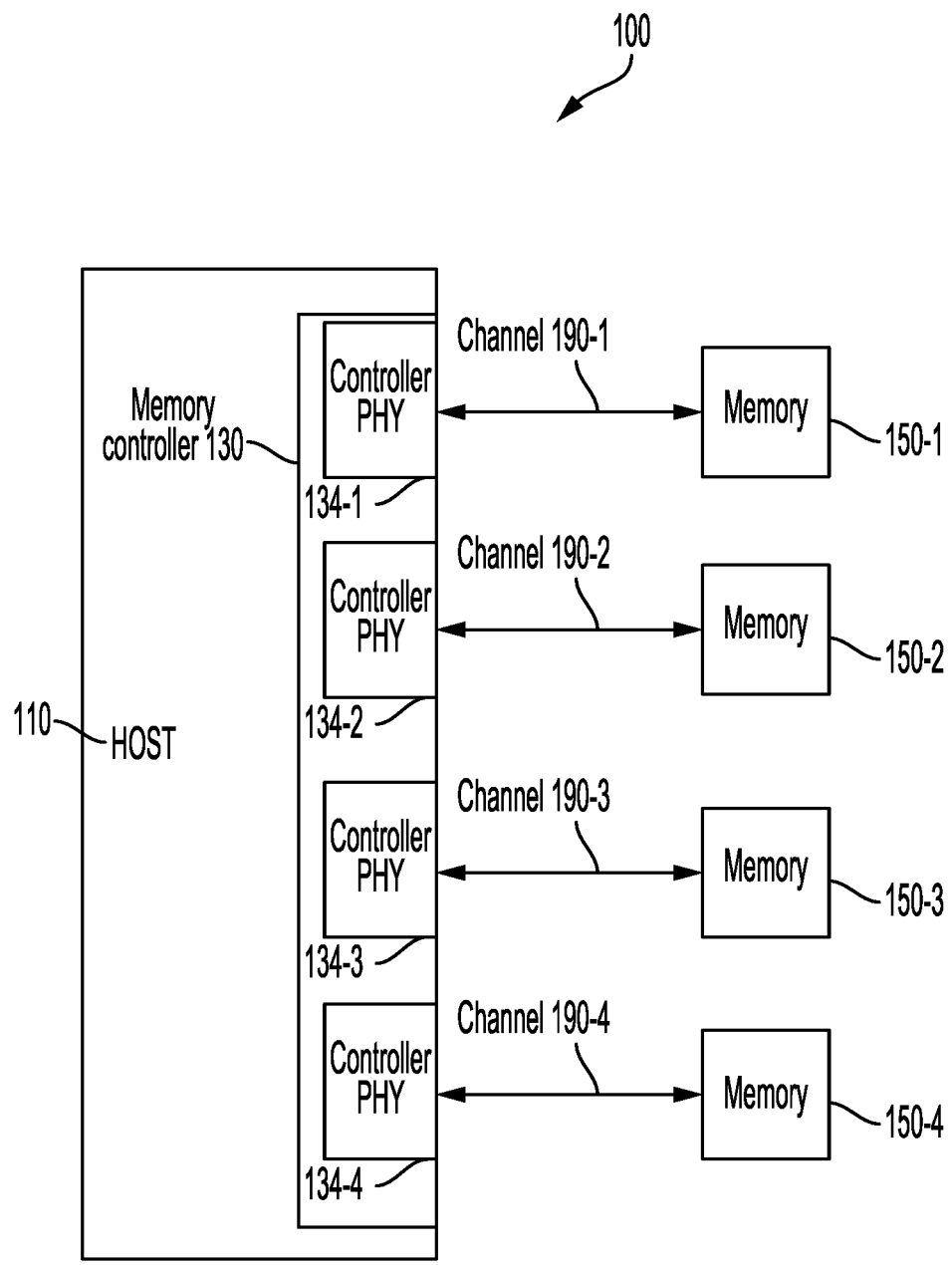
FIG. 1 shows a block diagram of an example computing system incorporating a host, memories, and channels coupling the host and the memories according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for supporting communication of data between a host and a memory device. The host may transmit data and accompanying metadata for storage in a memory array of the memory device. The memory device may include registers for receiving and accumulating the data and metadata for writing to the memory array. Metadata registers of the memory device may be organized to associate metadata with the data without using two separate addresses for the data and metadata. Examples of metadata for storage with the data include error correction codes (ECCs) to protect the data from errors and/or signatures to protect the data from tampering. Metadata may, however, be used for more than protection of the data.

Particular implementations of the subject matter described in this disclosure may be implemented to realize one or more of the following potential advantages or benefits. In some aspects, the present disclosure provides techniques for storing metadata with the data in a manner that fits current memory array architectures by coordinating the storing of data and metadata in a page of the memory array. Further, in some aspects, the metadata may be transmitted between the host and the memory device without dedicated connections in a channel between the host and the memory device for carrying the metadata.

As demands grow for the computing device to perform more functions with increasing speed, errors with data stored in a memory may grow as well. Errors may grow as data stored in memories and transferred between blocks increases. One example of protecting from such errors is the use of error correction codes (ECCs) associated with data. Schemes to improve error detection/correction in accessing a memory, without overburdening a host or the memory, are advantageous to improve system performance. ECC may be attached during transmission over channels, such as with link ECC. ECC may also be attached for storage into the memory array, such as with system ECC. In some examples, end-to-end system ECC may be implemented in a host by adding large density on-chip SRAM to store in-line ECC parity bits for certain data to enhance overall data reliability. However, such high-density on-chip SRAM is very expensive in terms of overall system cost, and high-density SRAM is susceptible to soft errors associated with SRAM cells.

In the present disclosure, system ECC data or other metadata are generated inside a host and transferred through non-data channels (e.g., RDQS_t in a write operation and DM in a read operation) between the host and a memory device. The ECC bits may be stored together with corresponding data into memory array (e.g., a DRAM cell array), such that the ECC protection provides a unified and consistent way to reduce overall system cost by allowing the removal of on-chip SRAM and to achieve better performance without requiring a separate memory link ECC. The present disclosure thus provides a simplified and efficient ECC scheme to implement system ECC by sharing certain resources with non-data connections. In such fashion, overall system cost may be reduced and performance improved.

FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices,).

The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150-1 to 150-4 may store instructions or data for the host to perform the computing functions.

The host 110 may include a memory controller 130, which may include controller PHY modules 134-1 to 134-4. Each of the controller PHY modules 134-1 to 134-4 may be coupled to a respective one of the memories 150-1 to 150-4 via respective channels 190-1 to 190-4. For ease of reference, read and write are referenced from a perspective of the host 110. For example, in a read operation, the host 110 may receive via one or more of the channels 190-1-190-4 data stored from one or more of the memories 150-1 to 150-4. In a write operation, the host 110 may provide via one or more of the channels 190-1-190-4 data to be written into one or more of the memories 150-1-150-4 for storage. The memory controller 130 may be configured to control various aspects, such as logic layers, of communications to and from the memories 150-1-150-4. The controller PHY modules 134-1-134-4 may be configured to control electrical characteristics (e.g., voltage levels, phase, delays, frequencies, etc.) of signals provided or received on the channels 190-1-190-4, respectively.

In some examples, the memories 150-1-150-4 may be LPDDR DRAM (e.g., LPDDR5, LPDDR6). In some examples, the memories 150-1-150-4 may be different kinds of memory, such as one LPDDR5, one LPDDR6, one Flash memory, and one SRAM, respectively. The host 110, the memories 150-1-150-4, and/or the channels 190-1-190-4 may operate according to an LPDDR (e.g., LPDDR5, LPDDR6) specification. In some examples, each of the channels 190-1-190-4 may include 16 bits of data (e.g., 16 DQs). In some examples, each of the channels 190-1-190-4 may operate on 32 bits of data (e.g., 32 DQs). In FIG. 1, four channels are shown, however the apparatus 100 may include more or less channels, such as 8 or 16 channels.

Figure 2A:
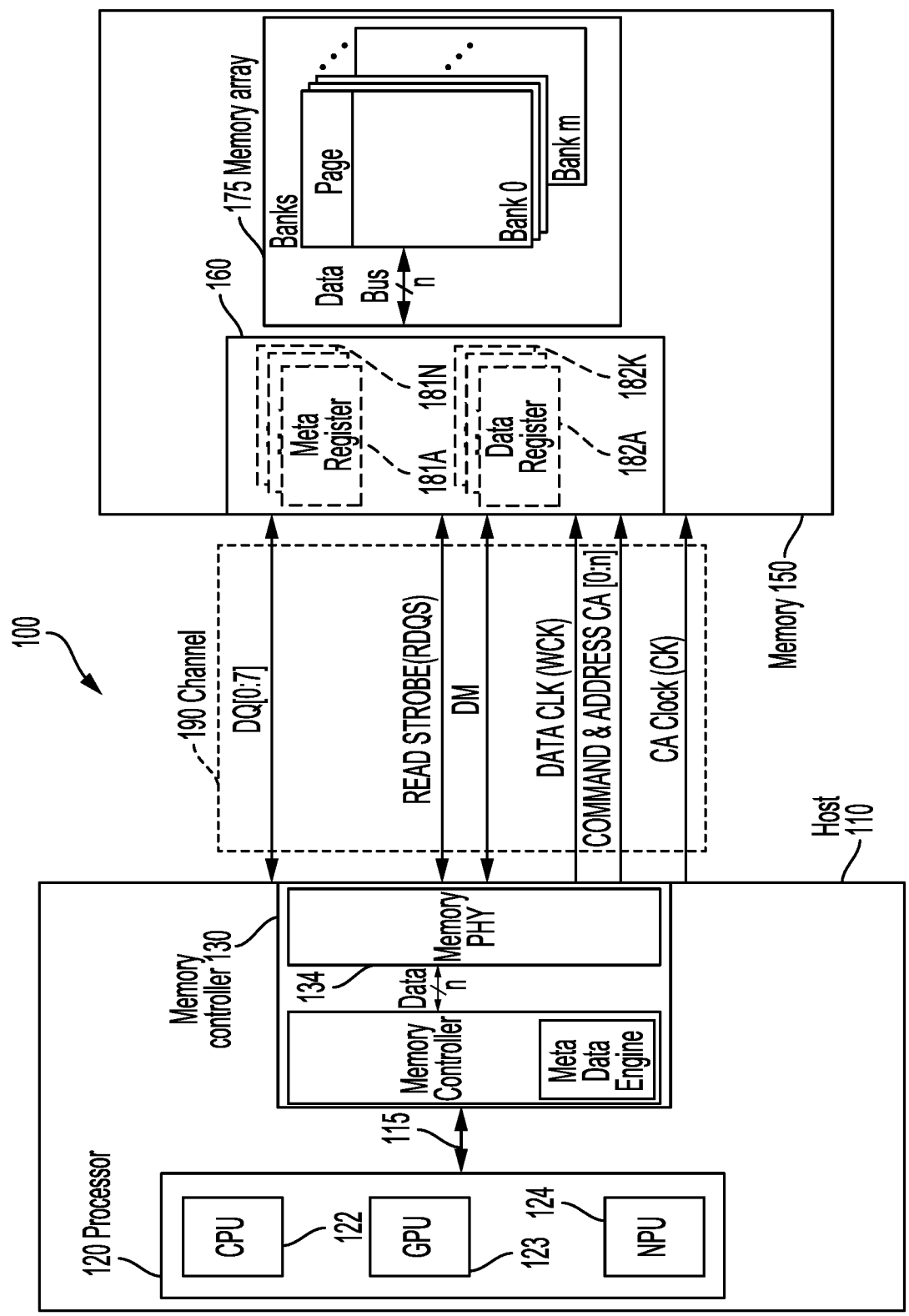
FIG. 2A shows a block diagram of an example computing system incorporating a host, memories, and channels coupling the host and the memories with another implementation of the channels according to one or more aspects of the disclosure.

A configuration of the host 110, the memory 150, and the channel 190 according to some aspects of the disclosure is shown with greater specificity in FIG. 2A. FIG. 2A illustrates another representation of the apparatus 100 having the host 110, the memory 150, and the channel 190 of FIG. 1. The channel 190 between host 110 and the memory 150 may include a plurality of connections, some of which carry data (e.g., user data or application data) and some of which carry non-data (e.g., addresses and other signaling information). For example, non-data connections in channel 190 may include a data clock (e.g., WCK) used in providing data to the respective memory 150 and a read data strobe (e.g., RDQS) used in receiving data from the respective memory 150, on a per byte basis. The channel 190 may further include a data mask (e.g., DM, sometimes referred to as data mask inversion DMI to indicate multiple functions performed by the signal connection) signaling used to mask certain part of data in a write operation. The channel 190 may further include command and address (e.g., CA[0:n]) and associated CA clock to provide commands (e.g., read or write commands) to the memory 150.

The host 110 may include at least one processor 120, which may include a CPU 122, a GPU 123, and/or an NPU 124. The host 110 may further include a memory controller 130 having a controller PHY module 134. The memory controller 130 may couple to the at least one processor 120 via a bus system 115 in performing the various computing functions. The term "bus system" may provide that elements coupled to the "bus system" may exchange information therebetween, directly or indirectly. In different embodiments, the "bus system" may encompass multiple physical connections as well as intervening stages such as buffers, latches, registers, etc. A module may be implemented in hardware, software, or a combination of hardware and software.

The memory controller 130 may send and/or receive blocks of data to other modules, such as the at least one processor 120 and/or the memory 150. The memory 150 may include a memory I/O module 160 (e.g., a PHY layer) configured to control electrical characteristics (e.g., voltage levels, phase, delays, frequencies, etc.) to provide or to receive signals on connections of the channel 190. For example, memory I/O module 160 may be configured to capture (e.g., to sample) data, commands, and addresses from the host 110 via the channel 190 and to output data to the host 110 via the channel 190. Example techniques for communicating on the channel 190 between the memory I/O module 160 and the memory controller 130 are shown in the examples of FIGS. 5A-B and 6A-B. The memory 150 may further include a memory array 175, which may include multiple memory cells (e.g., DRAM memory cells, MRAM memory cells, SRAM memory cells, Flash memory cells) that store values. The host 110 may read data stored in the memory array 175 and write data into the memory array 175, via the channel 190 and the memory I/O module 160. The memory array 175 may be divided into a plurality of banks with each bank organized as a plurality of pages.

Application or user data may be processed by the processor 120 and the memory controller 130 instructed to store and/or retrieve such data from the memory 150. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The data may be associated with metadata that provides information regarding the data being stored. Metadata may include properties or characteristics of the data. In one example, the metadata is an error correction code (ECC) that may be used to verify the integrity of the data after transmission and/or storage and to correct a limited number of errors in the data. The ECC is metadata because it describes a characteristic of the data that the ECC is associated with (e.g., the value that an algorithm generates when the data is provided to the algorithm as an input).

Figure 4A:
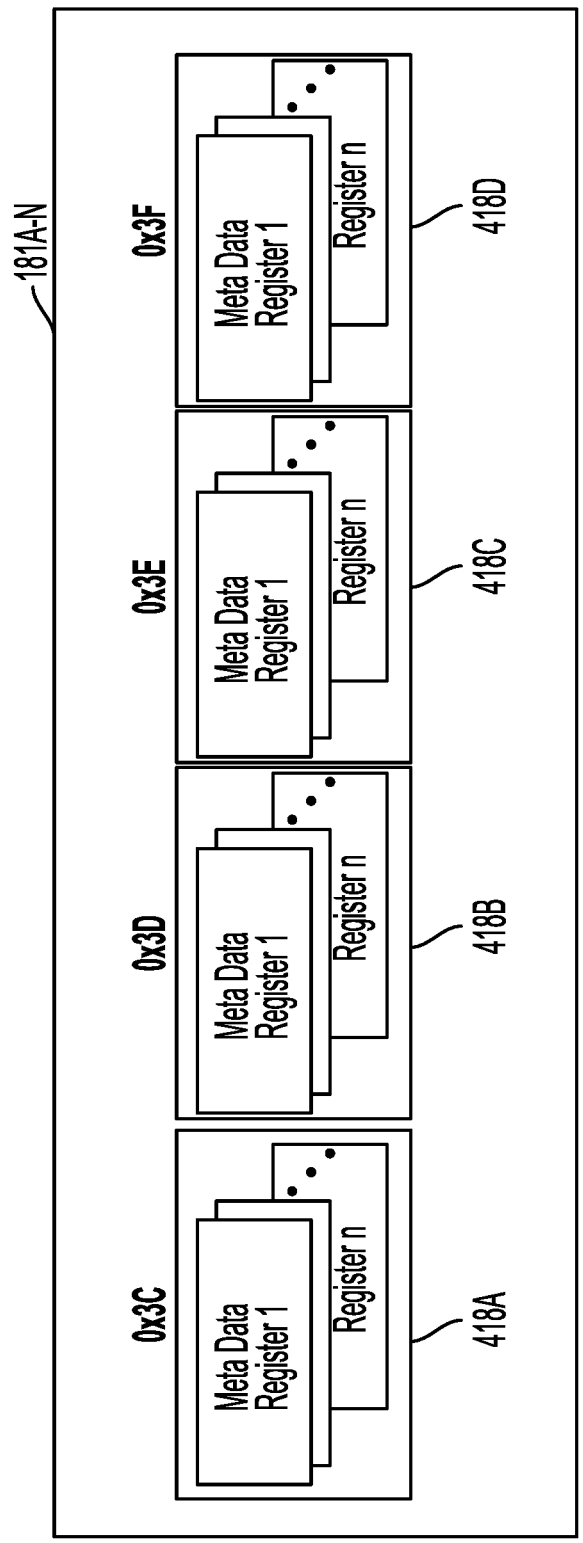
FIG. 4A shows a block diagram illustrating an example configuration for metadata registers according to one or more aspects of the disclosure.
Figure 4B:
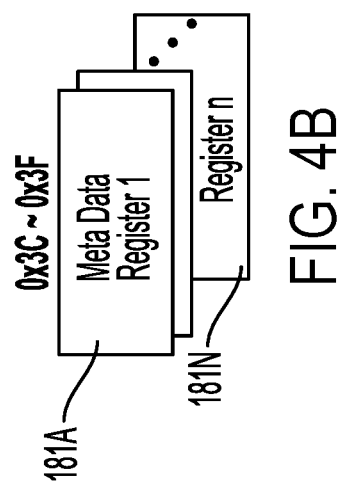
FIG. 4B shows a block diagram illustrating an example configuration for metadata registers according to one or more aspects of the disclosure.

Information transmitted across the channel 190 may be stored in registers in the memory I/O module 160 of the memory 150 as a temporary or short-term storage location prior to longer-term storage in the memory array 175. The memory I/O module 160 may include first and second registers for storing the data (e.g., user data or application data) and metadata, respectively. A first plurality of registers 182A-K store data; and a second plurality of registers 181A-N store the metadata. In different embodiments, K may be equal to N or K may be different from N with K greater than N or K less than N. In some embodiments, N and/or K may be one. The contents of registers 181A-N and 182A-K may then be transferred to memory array 175. In some embodiments, the contents of registers 181A-N and 182A-K may be transferred shortly after receipt in a serial manner to complete individual write commands. In some embodiments, the contents of registers 181A-N and 182A-K may be accumulated from multiple write commands received at the memory 150 and the metadata transferred to the memory array 175 when certain criteria are met. In some embodiments, there may be a single register 182 and/or a single register 181. For example, to reduce hardware size there may be a single data register 182 with multiple metadata registers 181A-N. A write command may be coupled with serialized data input from a host such that the write data (e.g., 32 Bytes) is stored to a 32 Byte register 182 temporarily. The data is then written to the first portion of the memory array automatically without any additional write commands from the host. Some example configurations for the metadata registers 181A-N are shown in FIGS. 4A-B.

Figure 2B:
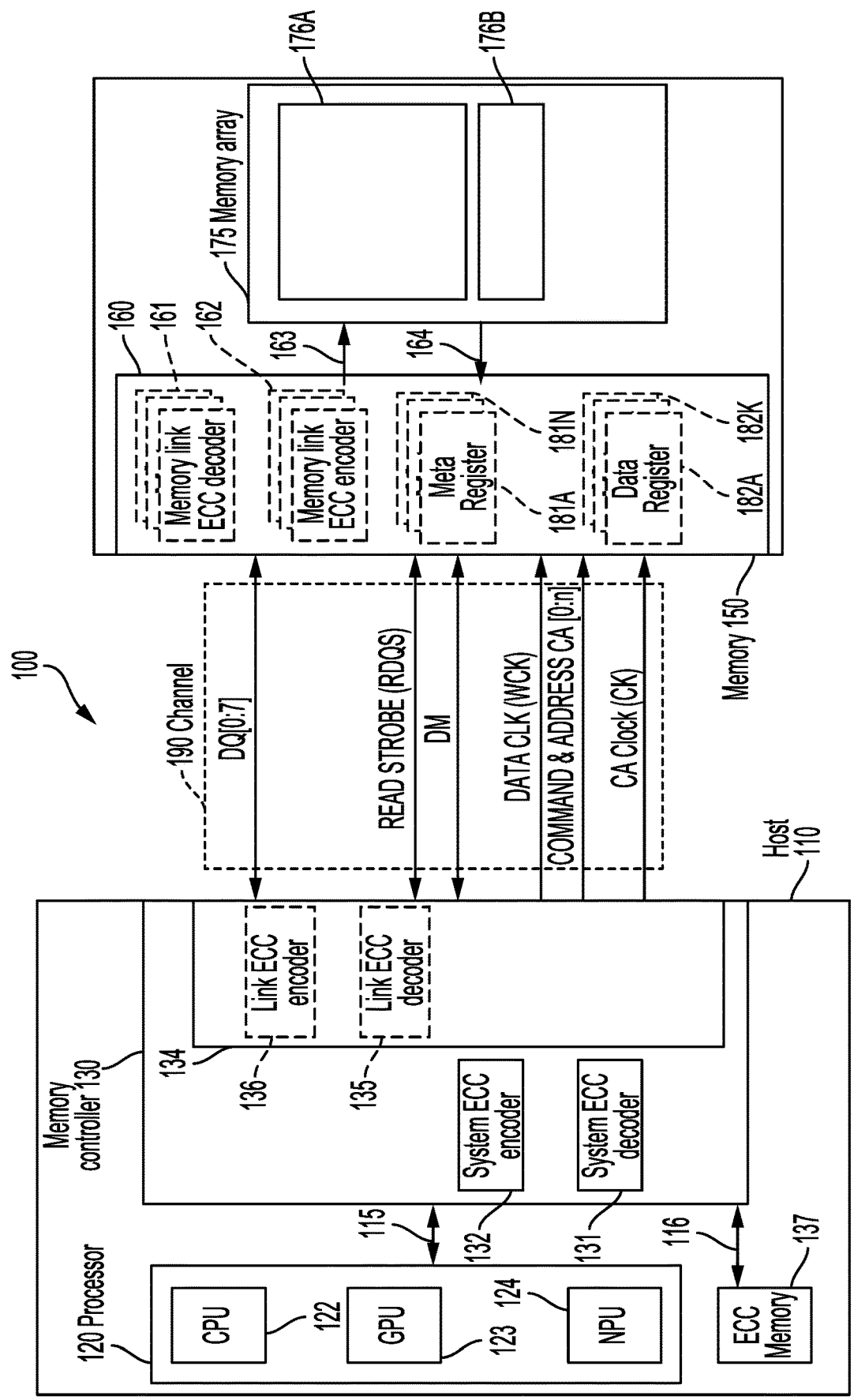
FIG. 2B shows a block diagram of an example computing system incorporating a host, memories, and channels coupling the host and the memories with link error correction code (ECC) protection of the channels according to one or more aspects of the disclosure.

The apparatus 100 may be configured to support the handling of metadata that accompanies the data transmitted between the host 110 and the memory 150. In one example, the metadata may be error correction codes (ECCs) used to protect data from at least some errors in communication and/or storage. Separate link ECC codes may be transmitted across the channel 190 to protect the data and/or metadata during transmission over the channel 190. A configuration of the host 110, the memory 150, and the channel 190 according to some aspects of the disclosure to support link ECC is shown in FIG. 2B. FIG. 2B illustrates another representation of the apparatus 100 having the host 110, the memory 150, and the channel 190 of FIGS. 1 and/or 2A.

The host 110 may be configured to perform multiple ECC functions. To support a system ECC function, the host 110 may include a system ECC memory 137. The memory controller 130 may be coupled to the system ECC memory 137 via a bus system 116. The memory controller 130 may further include a system ECC decoder 131 and a system ECC encoder 132. The controller PHY modules 134 may include a link ECC decoder 135 and a link ECC encoder 136.

The apparatus 100 may implement the system ECC function to detect/correct errors arising in performing computing functions (e.g., operating with the at least one processor 120). The system ECC function may be particularly useful for applications with low error tolerance, such as automotive applications. In some examples, the system ECC encoder 132 may generate system ECC for a block of data and the ECC associated with the block of data, such as by attaching the ECC bits to the block of data. The memory controller 130 may send the block of data to other modules, such as the at least one processor 120 and/or the memory 150, along with the system ECC. For example, the system ECC may be sent to the memory 150, and the memory 150 may store the system ECC in the same manner as data. In some embodiments, the memory 150 does not perform ECC functions based on the system ECC. In some examples, the memory controller 130 may receive a block of data and associated system ECC from, for example, the processor 120 and/or the memory 150. The memory controller 130 may then detect/correct errors in the block of data using the system ECC.

The host 110 is coupled to the memory 150 via the channel 190, which is illustrated for a byte of data, DQ[0:7]. The channel 190 and signaling between the host 110 and the memory 150 may be implemented in accordance with the JEDEC DRAM specification (e.g., LPDDR5, LPDDR6). As illustrated, the channel 190 includes signal connections of the DQs, a read data strobe (RDQS), a data mask (DM), a data clock (WCK), command and address (CA[0:n]), and command and address clock (CK). The host 110 may use the read data strobe RDQS to strobe (e.g., to clock) data in a read operation to receive the data on the DQs. The memory 150 may use the data mask DM to mask certain parts of the data from being written in a write operation. The memory 150 may use the data clock WCK to sample data on the DQs for a write operation. The memory 150 may use the command and address clock CK to clock (e.g., to receive) the CAs. A signal connection for each of the signaling may include a pin at the host 110, a pin at the memory 150, and a conductive trace or traces electrically connecting the pins. The conductive trace or traces may be part of a single integrated circuit (IC) on a silicon chip containing the processor 120 and the memory 150, may be part of a package on package (PoP) containing the processor 120 and the memory 150, or may be part of a printed circuit board (PCB) coupled to both the processor 120 and the memory 150.

The memory 150 may include a memory I/O module 160 (e.g., a PHY layer) configured to control electrical characteristics (e.g., voltage levels, phase, delays, frequencies, etc.) to provide or to receive signals on the channel 190. For example, memory I/O module 160 may be configured to capture (e.g., to sample) data, commands, and addresses from the host 110 via the channel 190 and to output data to the host 110 via the channel 190.

The memory 150 may further include a memory array 175, which may include multiple memory cells (e.g., DRAM memory cells) that store information. The host 110 may read data stored in the memory array 175 and write data into the memory array 175 via the channel 190. Moreover, the memory array 175 may be configured to store metadata such as ECCs (e.g., system or array ECCs) associated with the stored data. For example, a block of data (e.g., a word) in a first portion 176A of memory array 175 may be associated with a system ECC stored in a second portion 176B via a shared address. For example, reading (or writing into) the shared address at the memory array 175 may read out (or write into) both the block of data at the address and the system ECC associated with that block of data.

The apparatus 100 may include a link ECC function to detect/correct errors arising from data transmissions in the channel 190. The memory I/O module 160 may include a memory link ECC decoder 161 and a memory link ECC encoder 162. Link ECC information may be attached during transit over the channel 190 and verified at either the host 110 or the memory 150 and then discarded. For example, in a write operation, the link ECC encoder 136 may generate a link ECC associated with a block of data to be written (e.g., write data) into the memory 150. The host 110 may provide the write data to the memory 150 via DQs signal connections (e.g., data connections in the channel 190) and provide the link ECC to the memory 150 via a signal connection of the read data strobe RDQS (e.g., non-data connections in the channel 190). At the memory 150, the memory link ECC decoder 161 may use the link ECC to detect/correct errors in the write data. The link ECC might not be stored in the memory array 175, as the link ECC function is resolved at the memory I/O module 160. In a read operation, the memory link ECC encoder 162 may receive data (e.g., read data) stored in the memory array 175 (e.g., via the node 174, the array ECC decoder 171, and the node 164) and generate the link ECC associated with the read data. The memory I/O module 160 may provide the read data to the host 110 via the signal connections of the DQs and provide the link ECC to the host 110 via the signal connection of the data mask DM. At the host 110, the link ECC decoder 135 may detect/correct errors in the read data using the link ECC.

Referring to the metadata registers 181A-N, multiple metadata registers may be located in the memory I/O module 160 of memory 150 and associated with a carve-out memory space (e.g., in second portion 176B) of a bank (e.g., in first portion 176A) in the memory array 175. For example, column addresses "0x3C" to "0x3F" at each page may be reserved for metadata such as the ECC. A write operation executes for 32 Bytes of data to a target page and column location in the first portion 176A of the memory array 175 data stored in data registers 182A-K, and an associated 2 Bytes of metadata to a pre-determined area of second portion 176B of the memory array 175 metadata stored in metadata registers 181A-N. In a memory 150 configured to support such a write operation, the memory internal data bus (e.g., read bus 163) may remain configured for the word size of the data without separately accounting for the metadata. In some embodiments, a read command to normal memory space (such as "0x00"-"0x3B") executes to retrieve the normal 32 Byte read data from the first portion 176A and the 2 Byte of metadata from the second portion 176B simultaneously when an earlier read command executes to retrieve the metadata from the memory array into the metadata register based on a read command to metadata memory space (such as "0x3C"-"0x3F").

Figure 2C:
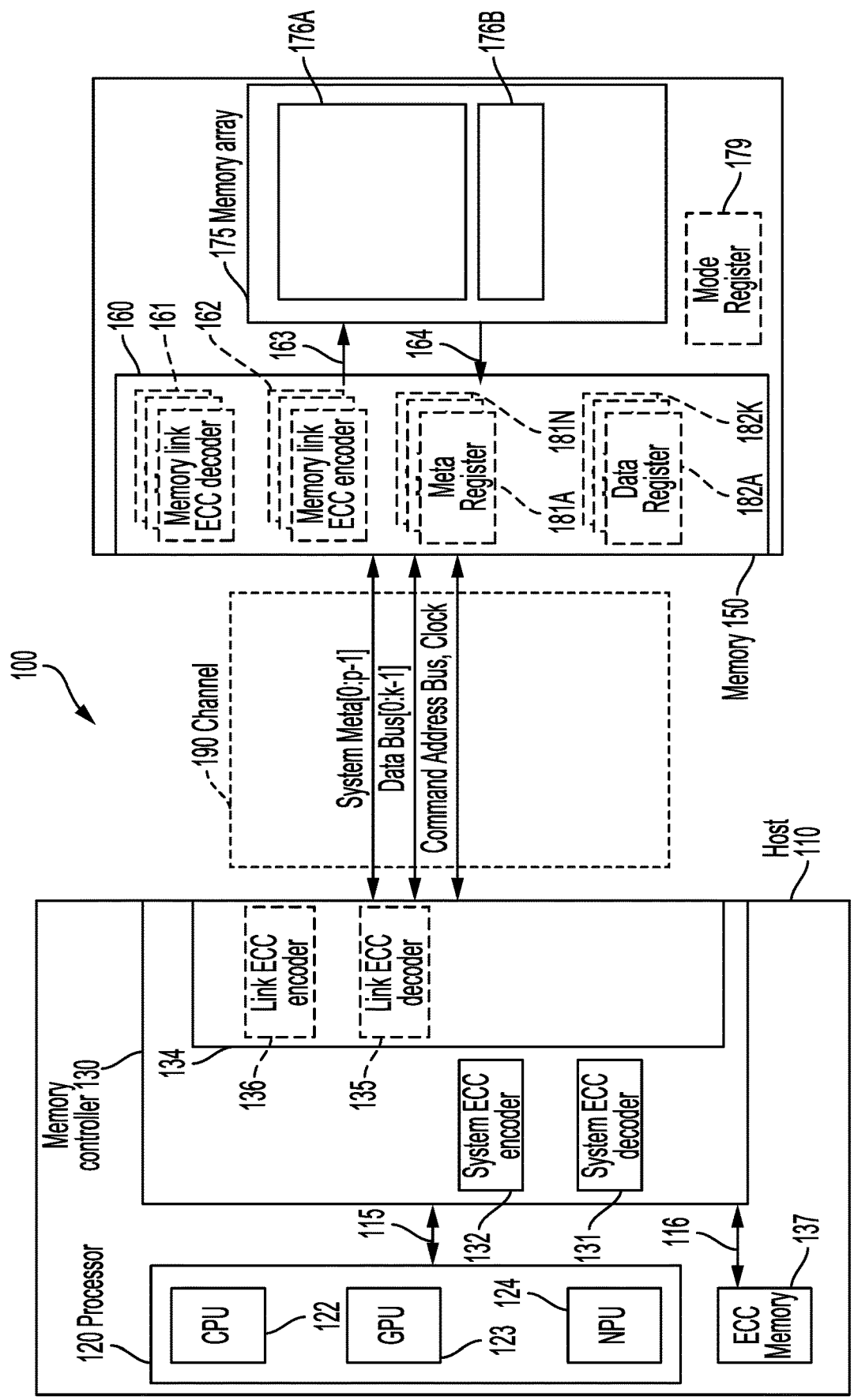
FIG. 2C shows a block diagram of an example computing system incorporating a host, memories, and channels coupling the host and the memories with another implementation of the channels according to one or more aspects of the disclosure.

Another configuration of the channel 190 for communicating metadata is shown in FIG. 2C. In the example of FIG. 2C, the channel 190 includes a dedicated system metadata bus. Data bus ("Data Bus[0:k−1]") transfers, e.g., 32 Byte, data and the System Metadata bus ("System Meta[0:p−1]") transfers, e.g., 2 Byte, metadata simultaneously to accompany data for a write or read operation. The Data bus is an example of a data connection within the channel 190, and the System Metadata bus is an example of a non-data connection within the channel 190.

Figure 3A:
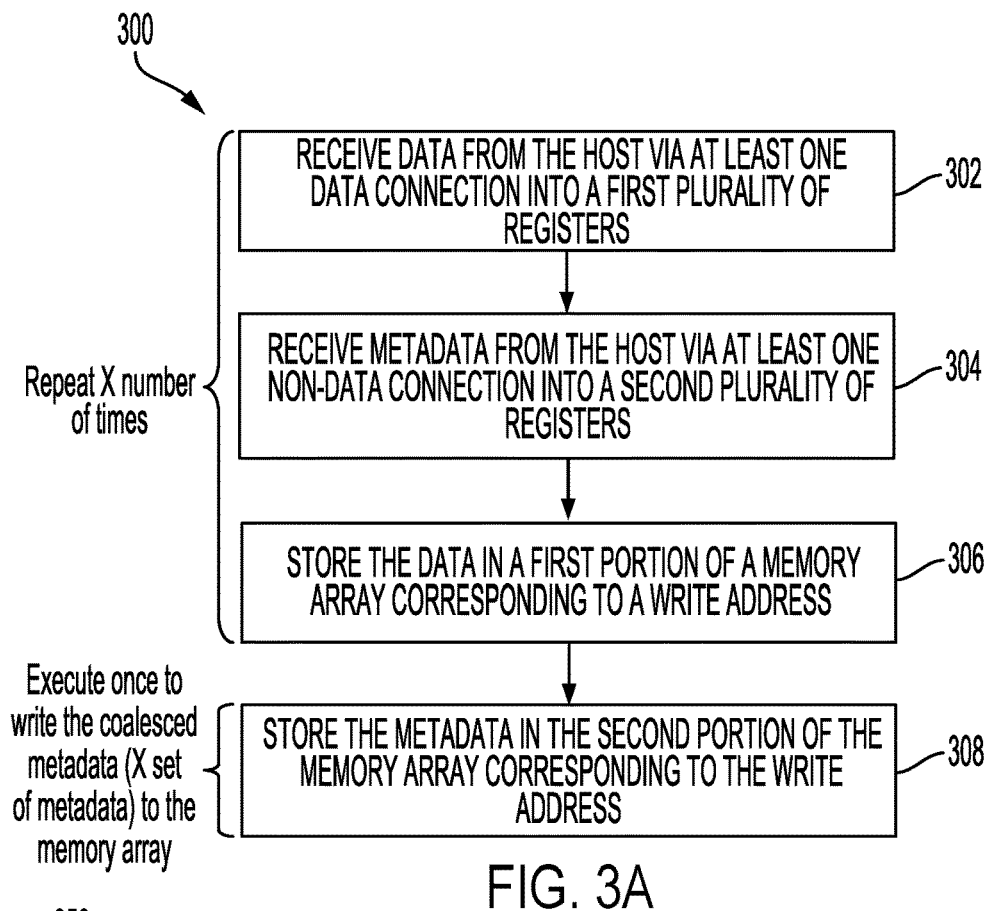
FIG. 3A shows a flow chart illustrating an example method for a memory executing a write command using metadata registers according to one or more aspects of the disclosure.

The data and metadata transmitted over the channel 190 may be transmitted through a combination of data and non-data connections. For example, the user data may be transmitted over the data connection DQ[0:7] and the metadata transmitted over a non-data connection (such as the data mask DM connection or the read strobe RDQS connection). An operation for executing a write command involving data and metadata by a memory device is described in FIG. 3A.

A write command issued by the host to the memory device of method 300 causes the memory device to perform operations, at block 302, of the memory device receiving data from the host via at least one data connection into a first plurality of registers. For example, data may be stored in data registers 182A-K by processing signals received over the data DQ[0:7] channel. Additionally, at block 304, the memory device receives metadata from the host via at least one non-data connection into a second plurality of registers. For example, metadata may be stored in the metadata registers 181A-N by processing signals received over the non-data read strobe RDQS channel. A data channel may be any channel carrying user or application data for storage at least temporarily in the memory array. A non-data channel may be any channel carrying data other than the user or application data.

After certain conditions are met, the write command may complete by performing blocks 306 and 308. At block 306 the data is stored from the first plurality of registers to a first portion of a memory array corresponding to a write address specified in the write command received for the receive data of block 302. For example, the contents of data registers 182A-K may be stored in a region of the first portion 176A of the memory array 175 based on the write address. At block 308 the metadata is stored from the second plurality or registers to a second portion of the memory array. For example, the contents of metadata registers 181A-N may be stored in a region of the second portion 176B of the memory array 175 corresponding to the write address (e.g., a region reserved for metadata corresponding to data at the write address). In some examples, the execution of blocks 306 and 308 may be triggered by certain criteria, such as a filling of the registers 181A-N or 182A-K, having a certain number of bytes of data for storage in a single page. In some examples, data may be accumulated in the registers 181A-N and/or 182A-K from two or more write commands before completing the write command by executing blocks 306 and 308. In some examples, data may be accumulated in the registers 181A-N and/or 182A-K while a sequence of write commands with addresses corresponding to the same page of memory are received. When a subsequent write command is received that is directed to a different page of memory, the registers 181A-N and/or 182A-K may be written to the memory array 176. In some embodiments of a memory device with a single register 182A, the data portion (e.g., corresponding to columns 0x00-0x3B) may be written through to the memory array without any delay such that only an additional write command to metadata portion of the memory array (e.g., corresponding to columns 0x3C-0x3F) is used to store metadata to the memory array.

Figure 3B:
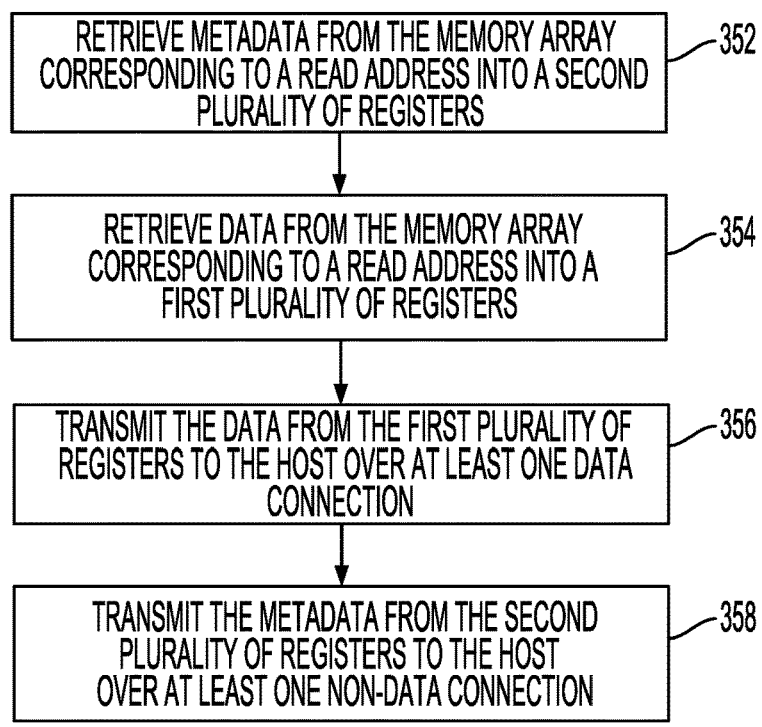
FIG. 3B shows a flow chart illustrating an example method for a memory executing a read command using metadata registers according to one or more aspects of the disclosure.

An operation for executing a read command involving data and metadata by a memory device is described in FIG. 3B. A read command issued by the host to the memory device of method 300 causes the memory 150 to perform a read operation. At block 352 metadata is received from the memory array corresponding to the read address into a second plurality of registers. At block 354, receiving of data from the memory array corresponding to a read address into a first plurality of registers. In some embodiments, the metadata is loaded into the second set of registers before normal data (e.g., data located in columns 0x00-0x3B) is accessed. In some embodiments, blocks 352 and 356 may be executed sequentially during a read operation to retrieve data and metadata at the same time from a memory device to a host. When a certain amount of data is accumulated in the registers, such as the registers being full or the requested data has been stored in the registers, the data may be transmitted from the registers through the channel 190 to the host. At block 356, the data from the first plurality of registers is transmitted to the host over at least one data connection. For example, the contents of the data registers 182A-K may be modulated onto the data DQ[0:7] connection of channel 190 and received at the memory controller 130 of host 110. At block 358, the data from the second plurality of registers is transmitted to the host over at least one non-data connection. For example, the contents of the metadata registers 181A-N may be modulated onto the non-data read data strobe RDQS connection of channel 190 and received at the memory controller 130 of host 110. The memory controller 130 of the host 110 may process the electrical signals received over the channel 190 and provided to the processor 120 and/or the ECC memory 137.

The metadata registers 181A-N may be associated with memory addresses of the memory array 175 according to different techniques. One example memory address mapping is shown in FIG. 4A. Certain addresses in a page may be assigned for metadata, such as by carving-out column space corresponding to 0x3C-0x3F. The metadata registers 181A-N may include n metadata registers dedicated to each column location. That is, column space 0x3C has a first set 481A of n meta data registers, column space 0x3D has a second set 481B of n metadata registers, column space 0x3E has a third set 481C of n meta data registers, and column space 0x3F has a fourth set 481D of n metadata registers. The metadata registers 181A-N may have a total of 4n registers in this example configuration, with each bank's column address fully associated with n metadata registers.

Another example memory address mapping is shown in FIG. 4B. The N metadata registers 181A-N may be coupled with all column locations of all banks. Any metadata from the reserved metadata column locations 0x3C-0x3F may be stored or retrieved to any of the n metadata registers throughout write or read operations, respectively. One example command protocol to select 1 of n metadata registers is a "CAS"+"WRITE/READ" command set that chooses 1 of n metadata registers through a target column address. The "CAS" command selects 1 of n metadata registers and the "WRITE/READ" command delivers the target column address ("0x3C" or "0x3D" or "0x3E" or "0x3F") for storage of the metadata in a particular one of the registers 181A-N.

Figure 5A:
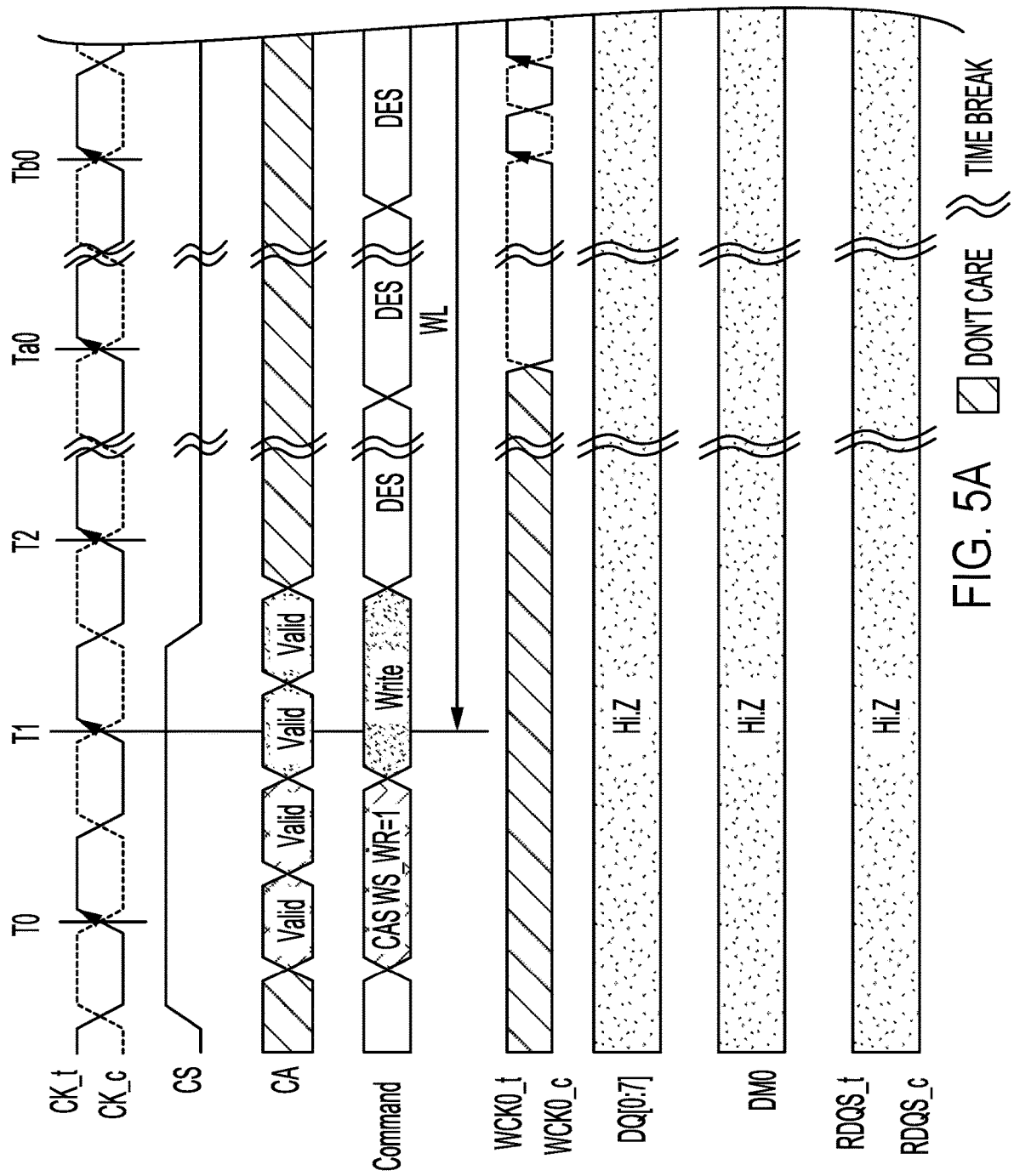
FIGS. 5A-5B show a timing diagram illustrating a write operation that transfers metadata through a non-data connection according to one or more aspects of the disclosure.
Figure 5B:
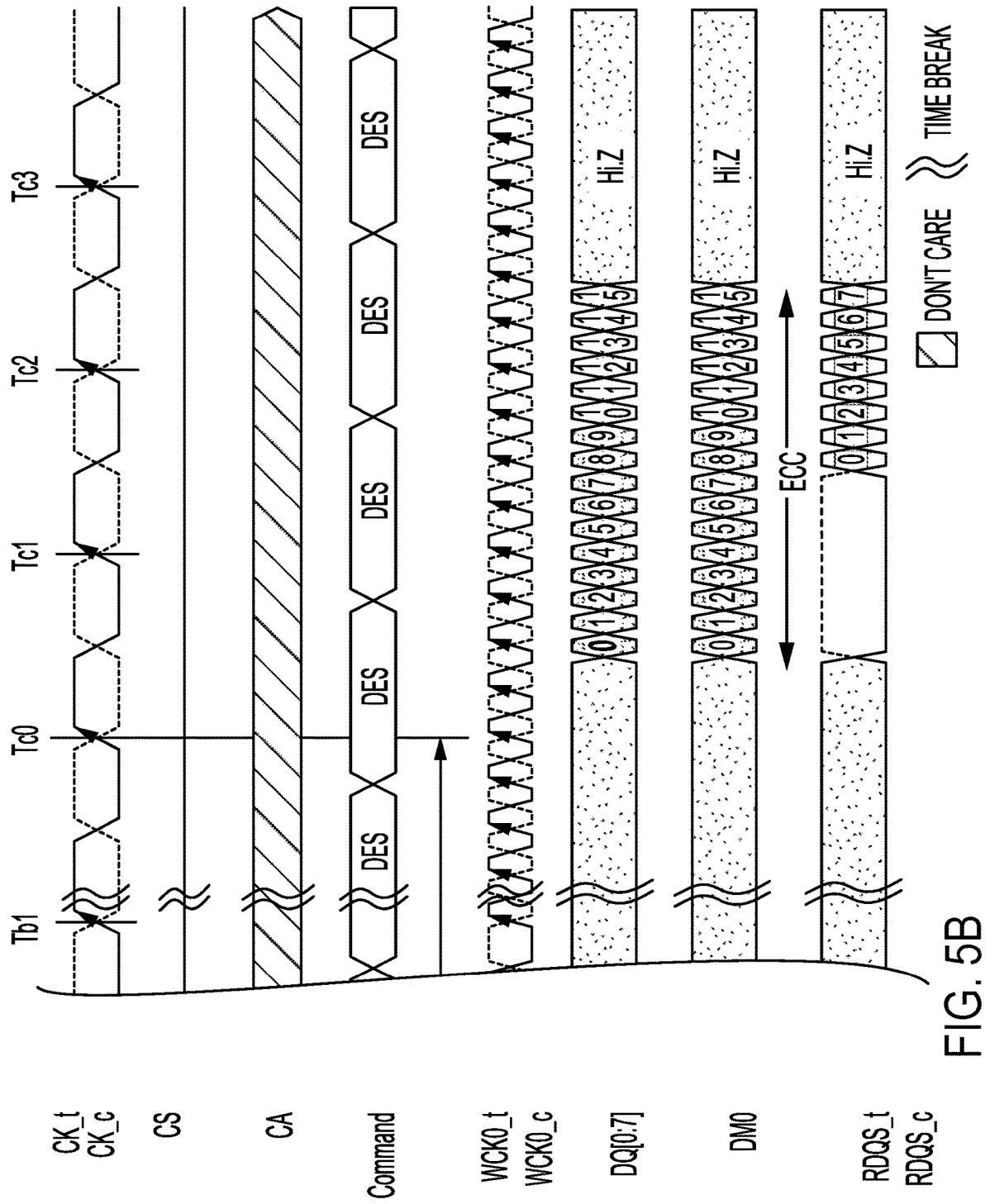

FIGS. 5A and 5B illustrate waveforms of transfer of data and metadata through an example channel in a write operation in accordance with certain aspects of the present disclosure. The command and address clock, CK, may be a differential signal having CK_t and CK_c signal connections. The data clock WCK may be a differential signal having WCK0_*t* and WCK0_*c* signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_c and falling edge of CK_t), a CAS command may be provided by the host 110 for a write operation to the memory 150. At T1, a write command may be provided by the host 110 to the memory 150.

After a time period write latency (WL), the host 110 may toggle the data clock WCK0_*t* and WCK0_*c* to provide the memory 150 with clocking for receiving data for write, on the DQ signal connections. At Tc0-Tc2, the memory 150 may receive 16 bytes of data serially, on each of the DQ[0:7] signal connections and clocked by the data clock WCK0_*t* and WCK0_*c*. The memory 150 may receive 16 bits of the data mask DM0 serially (e.g., based on the data clock WCK0_*t* and WCK0_*c*) to mask certain portions of the received data from the write operation. In some examples, the 16 bytes of data and 16 bits of the data mask DM0 may be received by the memory 150, with each bit of the data mask DM0 masking a corresponding byte of the received data.

At Tc0-Tc2, the memory 150 may receive, for example, 8 bits of ECC or other metadata on the RDQS_t signal connection, based on the data clock WCK0_*t* and WCK0_*c*. In a read operation, the RDQS_t signal connection may be configured to provide a read data strobe (RDQS) from the memory 150 to the host 110. In some examples, ECC link data may also be included on the RDQS connection, in addition to the metadata containing the system ECC. Referring to FIG. 2B, the memory link ECC decoder 161 may utilize the received link ECC to detect and/or correct errors in the received 16 bytes of data.

Figure 6A:
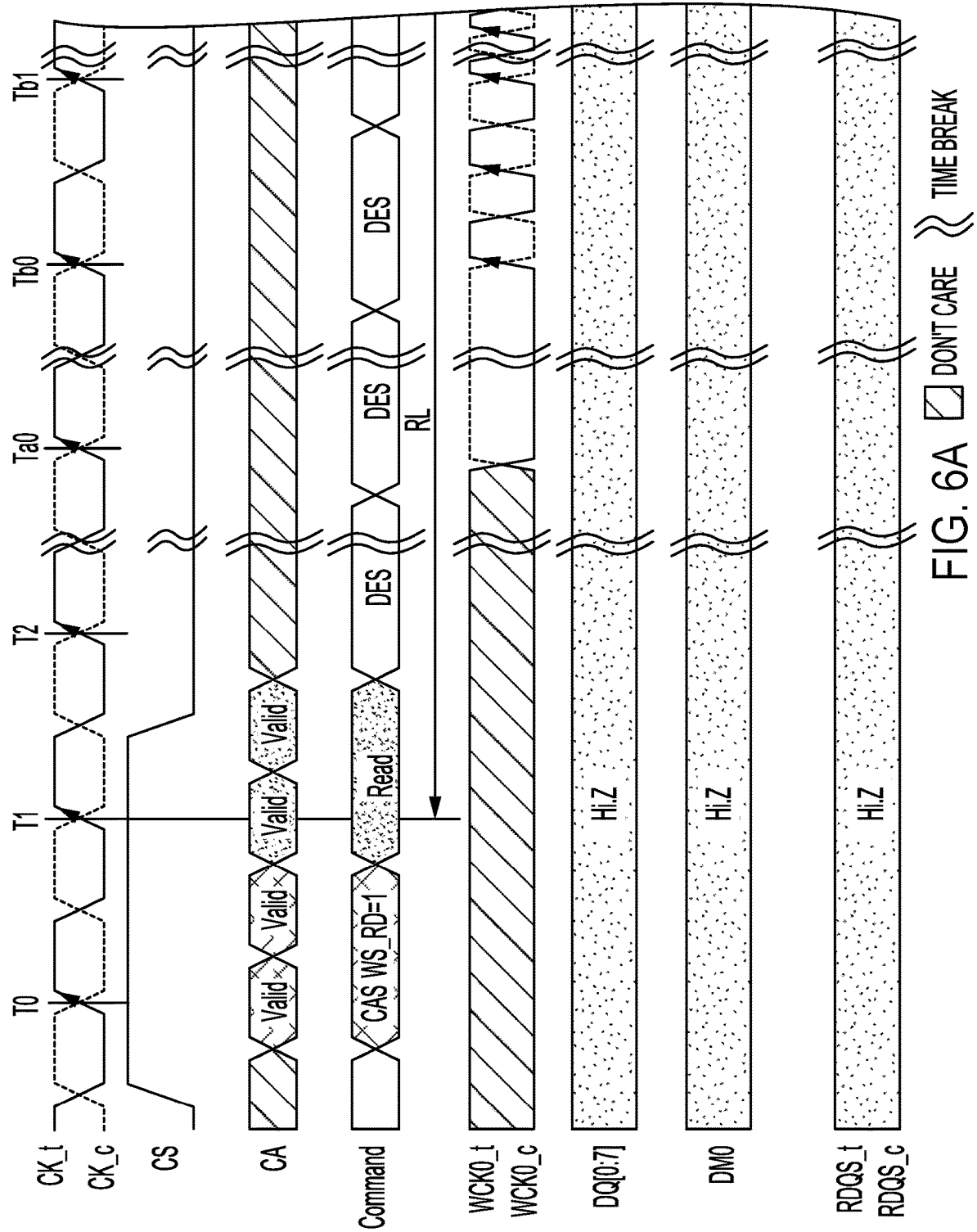
FIGS. 6A-6B show a timing diagram illustrating a read operation that transfers metadata through a non-data connection according to one or more aspects of the disclosure.
Figure 6B:
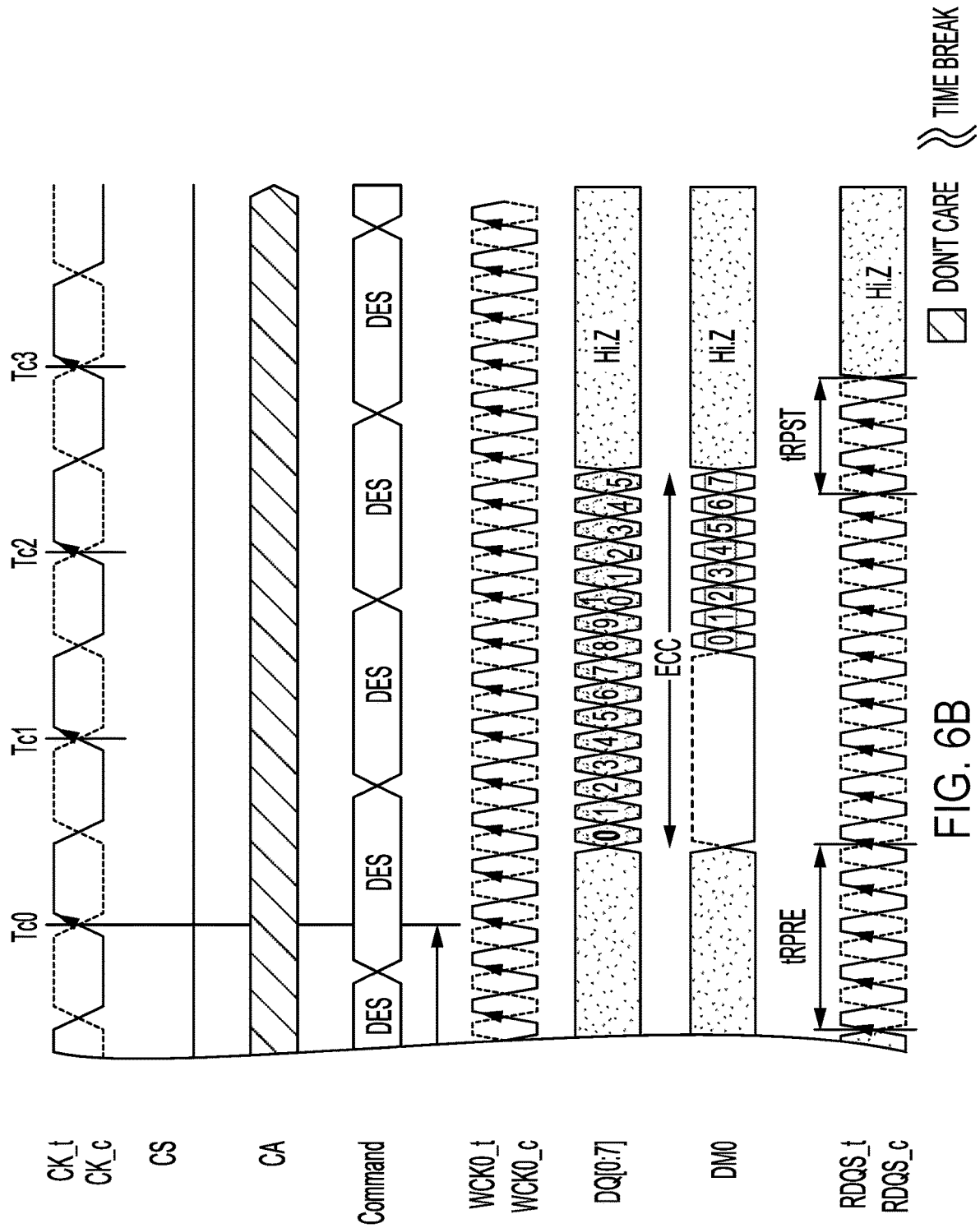

FIGS. 6A and 6B illustrate waveforms for reading of the data and metadata in the apparatus 100 of FIG. 2 in a read operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_c and falling edge of CK_t), a CAS command may be provided by the host 110 for a read operation to the memory 150. At T1, a read command may be provided by the host 110 to the memory 150.

After a time period read latency (RL), the memory 150 may toggle the read data strobe RDQS to provide the host 110 with clocking to receive data for the read operation on the DQ signal connections. At Tc0-Tc2, the host 110 may receive 16 bytes of data serially, on each of the DQ[0:7] signal connections and clocked by the read data strobe RDQS_t and RDQS_c. Thus, in the example, 16 bytes of data are received by the host 110.

At Tc0-Tc2, the host 110 may receive, for example, 8 bits of metadata, such as system ECC, on the data mask DM0 signal connection, based on (e.g., clocked by) the read data strobe RDQS_t and RDQS_c. In a write operation, the DM signal connection may be configured to provide a data mask from the host 110 to the memory 150. In some examples, a link ECC may also be inserted into the DM signal connection.

Figure 7:
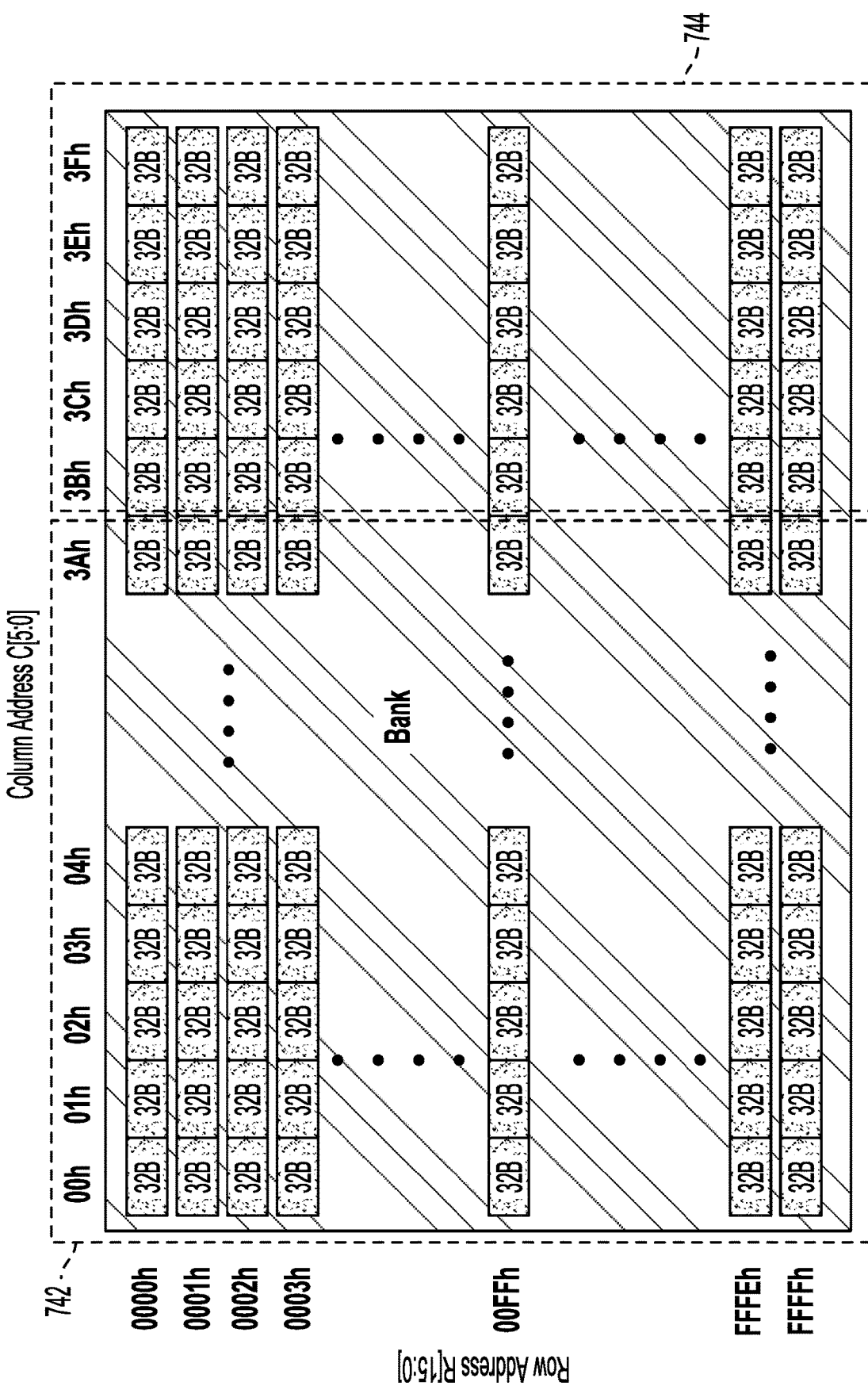
FIG. 7 shows a block diagram illustrating a configuration for a memory array in a memory device for storing metadata according to one or more aspects of the disclosure.

FIG. 7 illustrates a first address space 742 to access the first portion 176A of memory array 175 and a second address space 744 to access the second portion 176B of the memory array 175 in accordance with certain aspects of the present disclosure. In some examples, each of the first address space 742 and the second address space 744 may include row addresses and column addresses received from CAs of the channel 190. For example, the first address space 742 may correspond to row addresses 0000h to FFFFh and to column addresses 00h to 3Ah, and the second address space 744 may correspond to row addresses 0000h to FFFFh and to column addresses 3Bh to 3Fh. The total address space of the memory array 175 thus ranges from row address 0000h and column address 00h to row address FFFFh and column address 3Fh.

The first portion 176A may be addressable by a first address (e.g., an address in the first address space 742), and the second portion 176B may be addressable by a second address (e.g., an address in the second address space 744). Thus, the first address and the second address may differ in column addressing. While the present disclosure utilizes an example of the first address space 742 and the second address space 744 varying in column space, other examples are possible such as the row-based example of FIG. 8.

Figure 8:
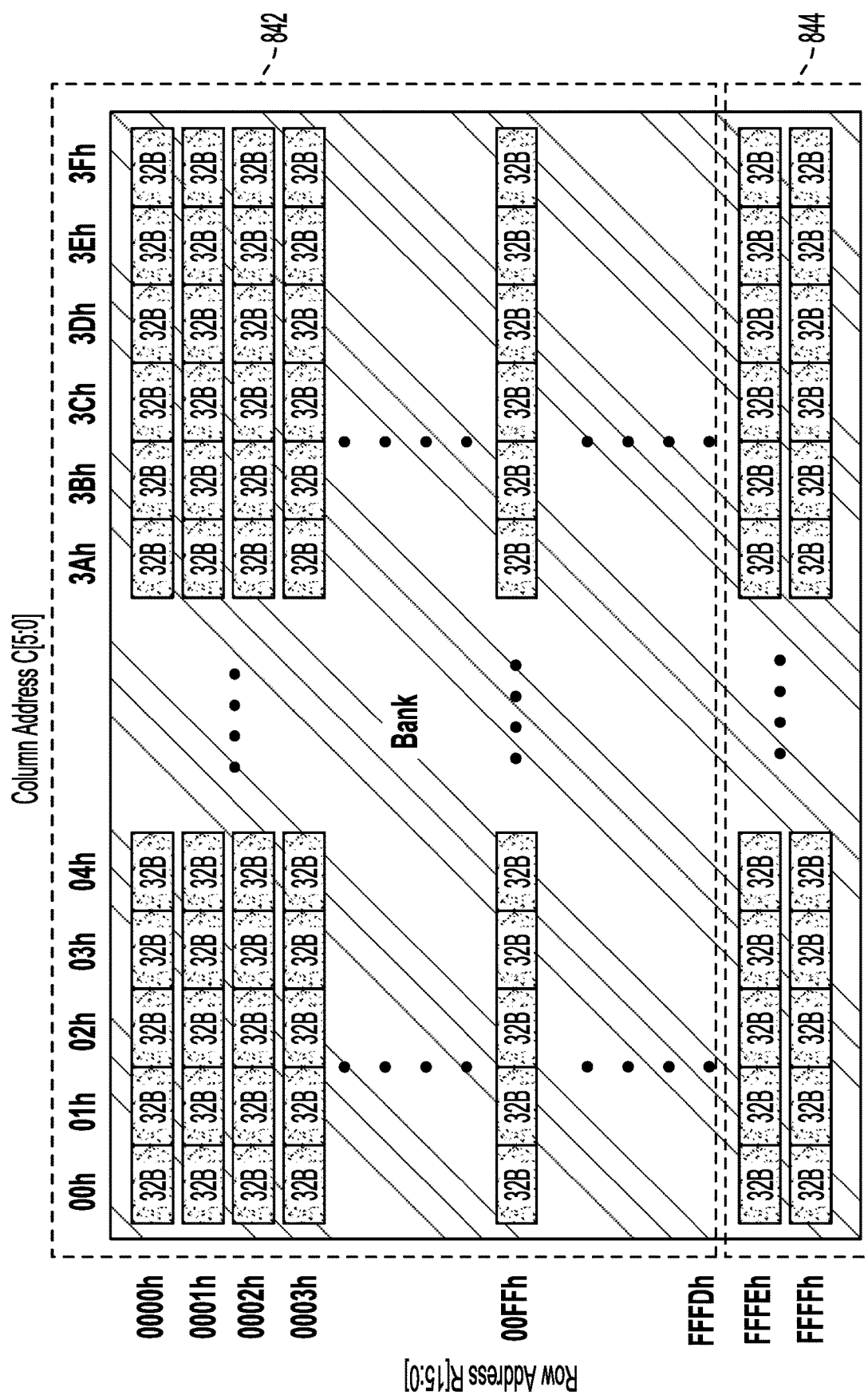
FIG. 8 shows a block diagram illustrating another configuration for a memory array in a memory device for storing metadata according to one or more aspects of the disclosure.

FIG. 8 illustrates an example of the first address space 842 and the second address space 844 differing in row space, in accordance with certain aspects of the present disclosure. In FIG. 8, the first portion 176A may be accessed by the first address space 842, which correspond to row addresses 0000h up to FFFDh. The second portion 176B may be accessed by the second address space 844, which correspond to row addresses FFFEh up to FFFFh. In the example, the first address space 842 and the second address space 844 may differ in row space, and accordingly, the first address used to access the first portion 176A and the second address used to access the second portion 176B may differ in row addressing.

Figure 9:
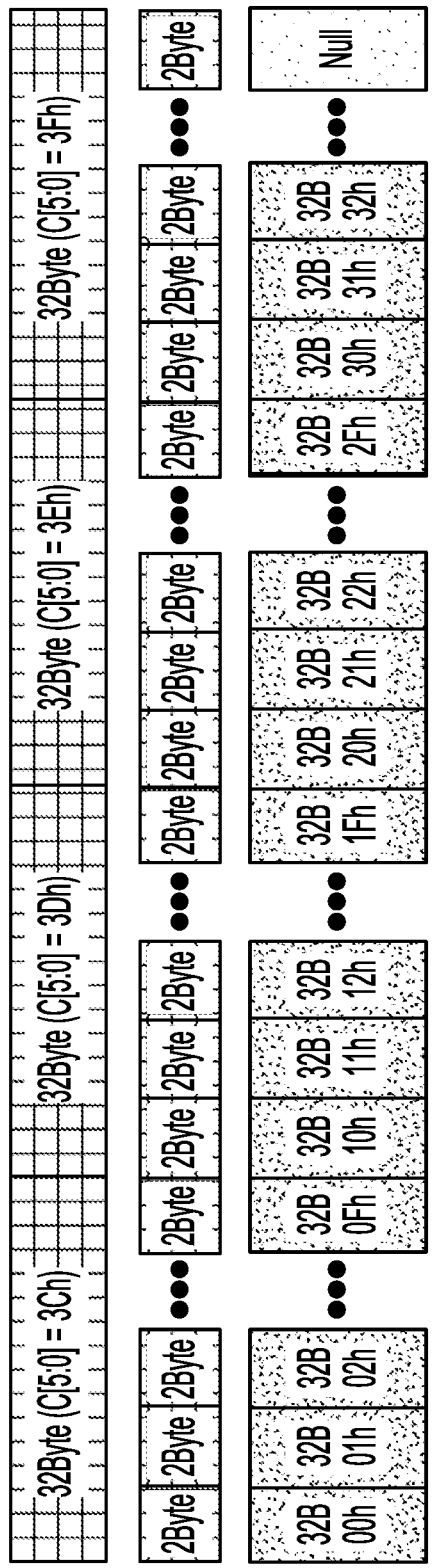
FIG. 9 shows a block diagram illustrating storage of data and metadata in a memory array according to one or more aspects of the disclosure.

FIG. 9 illustrate examples of data and address mapping in accordance with certain aspects of the present disclosure. FIG. 9 illustrates, for example, the data (written into or read from the first portion 176A; labeled as normal data) may be 32 Bytes and the ECC (written into or read from the second portion 176B) may be 16 bits or less. Address space not used (labeled as "null") is aggregated within the column address 3Fh space, while in other examples, the address space not used is distributed among the column address space. In the execution of each read or write command, a total of 34 Bytes (32 Bytes of the data and 2 Bytes of the system ECC or other metadata) may be transmitted between the host 110 and the memory 150 (e.g., via the at least one data connection and the at least one non-data connection). In such a configuration, 2 Bytes of the ECC may be implemented with no memory bandwidth loss. Moreover, additional 2 Bytes of ECC ("c") may be implemented to further protect the 32 Bytes of the data ("n") and the two Bytes of the system ECC ("s").

An example mapping for a portion of a memory array is shown in the table below. The column address for metadata is associated with the column address of the corresponding data. The column address for the metadata is associated with a portion of the memory array reserved for metadata, such as second portion 176B of memory array 175 in FIGS. 2A-2B.

| Column Address of 32 Byte Data | Column Address for System Meta Data | 32 Byte Meta Data Configuration |
| --- | --- | --- |
| 0x00 | 0x3C | BA[3:0] = 0x0 |
| 0x01 |  | BA[3:0] = 0x1 |
| ~ |  | ~ |
| 0x0F |  | BA[3:0] = 0xF |
| 0x10 | 0x3D | BA[3:0] = 0x0 |
| 0x11 |  | BA[3:0] = 0x1 |
| ~ |  | ~ |
| 0x1F |  | BA[3:0] = 0xF |
| 0x20 | 0x3E | BA[3:0] = 0x0 |
| 0x21 |  | BA[3:0] = 0x1 |
| ~ |  | ~ |
| 0x2F |  | BA[3:0] = 0xF |
| 0x30 | 0x3F | BA[3:0] = 0x0 |
| 0x31 |  | BA[3:0] = 0x1 |
| ~ |  | ~ |
| 0x3B |  | BA[3:0] = 0xB |

A wireless communications device may include a memory configured to receive and output data through data registers and metadata registers as illustrated in at least FIGS. 2A-2C, and according to any of the aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD)

player, a portable digital video player, an automobile, a vehicle component, avionics systems, a drone, and a multicopter.

In one or more aspects, techniques for memory storage and retrieval may include additional aspects, such as any single aspect or any combination of aspects described below or in connection with one or more other processes or devices described elsewhere herein. In a first aspect, supporting data operations may include an apparatus configured to store and retrieve data from a memory array of a memory device. The apparatus may respond to commands from a host device, such as a read command and a write command, and, in response, provide certain data from the memory array on a channel coupling the memory device to a host device. The apparatus may include a memory array and a memory I/O module coupled to the memory array and configured to communicate with a host through a channel comprising a plurality of connections including at least one data connection and at least one non-data connection. In some implementations, the memory device is included in a wireless device, such as a UE. In some implementations, the apparatus includes a remote server, such as a cloud-based computing solution, which includes a memory device.

In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of accessing, including writing or reading, data in a memory array may include one or more operations described herein with reference to the apparatus.

In a second aspect, in combination with the first aspect, the apparatus is further configured for receiving data from the host via the at least one data connection into the at least one first register; receiving metadata from the host via the at least one non-data connection into the at least one second register; storing the data in the first portion of the memory array; and storing the metadata in the second portion of the memory array.

In a third aspect, in combination with one or more of the first aspect or the second aspect, the data and the metadata are received simultaneously during a single write command.

In a fourth aspect, in combination with one or more of the first aspect through the third aspect, the apparatus may be configured for receiving a first address through at least one second non-data connection corresponding to the data, wherein storing the data in the first portion of the memory array is based on the first address; and storing the metadata in the second portion of the memory array is to a second address corresponding to the first address.

In a fifth aspect, in combination with one or more of the first aspect through the fourth aspect, receiving metadata from the host via the at least one non-data connection into the second plurality of registers comprises receiving a plurality of metadata comprising first metadata corresponding to a first write operation and second metadata corresponding to a second write operation into the at least one second register, the plurality of metadata corresponding to a plurality of memory addresses of a page of the memory array; and storing the metadata in the second portion of the memory array comprises writing the plurality of metadata into the page of the memory array from the at least one second register to complete the first write operation and the second write operation.

In a sixth aspect, in combination with one or more of the first aspect through the fifth aspect, the metadata comprises an error correction code (ECC).

In a seventh aspect, in combination with one or more of the first aspect through the sixth aspect, the metadata comprises a signature for authenticating the data corresponding to the metadata.

In an eighth aspect, in combination with one or more of the first aspect through the seventh aspect, the at least one non-data connection comprises a data mask inversion (DMI) portion of the channel, wherein a number of connections of the data mask inversion (DMI) portion is less than a number of connections of the at least one data connection.

In a ninth aspect, in combination with one or more of the first aspect through the eighth aspect, the at least one non-data connection comprises a read data strobe (RDQS) portion of the channel, wherein a number of connections of the read data strobe (RDQS) portion is less than a number of connections of the at least one data connection.

In a tenth aspect, in combination with one or more of the first aspect through the ninth aspect, the at least one second register comprises a first portion associated with a first column address and a second portion associated with a second column address, and receiving the metadata comprises receiving the metadata into the first portion or the second portion based on a memory address for the data associated with the metadata specified by a write command received by the memory I/O module corresponding to the data.

In an eleventh aspect, in combination with one or more of the first aspect through the tenth aspect, the at least one second register comprises a first portion and a second portion, and receiving the metadata comprises receiving the metadata into the first portion or the second portion based on an indicator specified by a write command received by the memory I/O module.

In a twelfth aspect, in combination with one or more of the first aspect through the eleventh aspect, the memory I/O module may be configured for retrieving data from the first portion of the memory array into the at least one first register; retrieving metadata from the second portion of the memory array into the at least one second register; transmitting the data to the host via the at least one data connection from the at least one first register; and transmitting the metadata to the host via the at least one non-data connection from the at least one second register.

In a thirteenth aspect, in combination with one or more of the first aspect through the twelfth aspect, the data and the metadata are retrieved simultaneously during a single read command.

In a fourteenth aspect, in combination with one or more of the first aspect through the thirteenth aspect, the memory I/O module is further configured for performing operations including receiving a first address through at least one second non-data connection corresponding to the data, wherein retrieving the data from the first portion of the memory array is based on the first address; and retrieving the metadata from the second portion of the memory array is from a second address corresponding to the first address.

In a fifteenth aspect, in combination with one or more of the first aspect through the fourteenth aspect, retrieving metadata from the second portion of the memory array into the at least one second register comprises retrieving a plurality of metadata comprising first metadata corresponding to a first read operation and second metadata corresponding to a second read operation during a single page operation, the plurality of metadata corresponding to a plurality of memory addresses of a page of the memory array; and transmitting metadata to the host via the at least one non-data connection from the second plurality of registers comprises transmitting the plurality of metadata.

In a sixteenth aspect, in combination with one or more of the first aspect through the fifteenth aspect, an apparatus includes a host device configured to communicate with a memory device through a channel, the host device comprising a memory controller coupled to the channel, the memory controller configured perform operations including transmitting data between the memory controller and at least one first register of the memory device through at least one data connection of the channel; and transmitting metadata between the memory controller and at least one second register of the memory device through at least one non-data connection of the channel.

In a seventeenth aspect, in combination with one or more of the first aspect through the sixteenth aspect, the host device is configured for signaling a read command on the channel specifying a read address for retrieving the data and retrieving the metadata from the memory device.

In an eighteenth aspect, in combination with one or more of the first aspect through the seventeenth aspect, the read addresses identifies a set of the at least one second register for storing the metadata.

In a nineteenth aspect, in combination with one or more of the first aspect through the eighteenth aspect, the read command comprises an indicator specifying a set of the at least one second register for storing the metadata.

In a twentieth aspect, in combination with one or more of the first aspect through the nineteenth aspect, the host device is configured for signaling a write command on the channel specifying a write address for storing the data and transmitting the data to the memory device.

In a twenty-first aspect, in combination with one or more of the first aspect through the twentieth aspect, the write address identifies a set of the at least one second register for storing the metadata.

In a twenty-second aspect, in combination with one or more of the first aspect through the twenty-first aspect, the write command comprises an indicator specifying one of the at least one second register for storing the metadata.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2C include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 1 and 2A-2C may be combined with one or more blocks (or operations) described with reference to another of the figures. For example, one or more blocks (or operations) of FIGS. 3A-3B may be combined with one or more blocks (or operations) of FIGS. 1 and 2A-2C. As another example, one or more blocks associated with FIGS. 5A-5B and 6A-6B may be combined with one or more blocks (or operations) associated with FIGS. 1 and 2A-2C.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. are employed for ease of reference and may not carry substantive meanings. Likewise, names for components/modules may be adopted for ease of reference and might not limit the components/modules. For example, such non-limiting names may include "read ECC" signal connection and "write ECC" signal connection.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory device, comprising:
a dynamic random access memory array comprising a first portion and a second portion; a memory I/O module:
coupled to the dynamic random access memory array;
configured to communicate with a host through a channel comprising a plurality of connections including at least one data connection and at least one non-data connection; and
comprised of at least one first register and at least one second register,
the memory I/O module further configured to perform operations comprising:
receiving data from the host via the at least one data connection into the at least one first register;
receiving metadata from the host via the at least one non-data connection into the at least one second register;
storing the data in the first portion of the dynamic random access memory array; and
storing the metadata in the second portion of the dynamic random access memory array based on a memory address for the data associated with the metadata specified by a write command received by the memory I/O module corresponding to the data.

2. The memory device of claim 1, wherein the data and the metadata are received simultaneously during a single write command.

3. The memory device of claim 1, wherein the memory I/O module is further configured for performing operations comprising: receiving a first address through at least one second non-data connection corresponding to the data, wherein: storing the data in the first portion of the dynamic random access memory array is based on the first address; and storing the metadata in the second portion of the dynamic random access memory array is to a second address corresponding to the first address.

4. The memory device of claim 1, wherein: receiving metadata from the host via the at least one non-data connection into the at least one second register comprises receiving a plurality of metadata comprising first metadata corresponding to a first write operation and second metadata corresponding to a second write operation into the at least one second register, the plurality of metadata corresponding to a plurality of memory addresses of a page of the dynamic random access memory array; and storing the metadata in the second portion of the dynamic random access memory array comprises writing the plurality of metadata into the page of the dynamic random access memory array from the at least one second register to complete the first write operation and the second write operation.

5. The memory device of claim 1, wherein the metadata comprises an error correction code (ECC).

6. The memory device of claim 1, wherein the metadata comprises a signature for authenticating the data corresponding to the metadata.

7. The memory device of claim 1, wherein the at least one non-data connection comprises a data mask inversion (DMI) portion of the channel, wherein a number of connections of the data mask inversion (DMI) portion is less than a number of connections of the at least one data connection.

8. The memory device of claim 1, wherein the at least one non-data connection comprises a read data strobe (RDQS) portion of the channel, wherein a number of connections of the read data strobe (RDQS) portion is less than a number of connections of the at least one data connection.

9. The memory device of claim 1, wherein: the at least one second register comprises a first portion associated with a first column address and a second portion associated with a second column address, and receiving the metadata comprises receiving the metadata into the first portion or the second portion based on a memory address for the data associated with the metadata specified by a write command received by the memory I/O module corresponding to the data.

10. The memory device of claim 1, wherein: the at least one second register comprises a first portion and a second portion, and receiving the metadata comprises receiving the metadata into the first portion or the second portion based on an indicator specified by a write command received by the memory I/O module.

11. A method, comprising: receiving data, at a memory device, from a host via at least one data connection into at least one first register; receiving metadata, at the memory device, from the host via at least one non-data connection into at least one second register; storing, by the memory device, the data from the at least one first register into a first portion of a dynamic random access memory array; and storing, by the memory device, the metadata from the at least one second register into a second portion of the dynamic random access memory array based on a memory address for the data associated with the metadata specified by a write command corresponding to the data.

12. The method of claim 11, further comprising: retrieving the data from the dynamic random access memory array into the at least one first register; retrieving the metadata from the dynamic random access memory array into the at least one second register; transmitting the data to the host via the at least one data connection from the at least one first register; and transmitting the metadata to the host via the at least one non-data connection from the at least one second register.

13. The method of claim 11, further comprising: receiving a first address through at least one second non-data connection corresponding to the data, wherein: storing the data in the first portion of the dynamic random access memory array is based on the first address; and storing the metadata in the second portion of the dynamic random access memory array is to a second address corresponding to the first address.

14. The method of claim 11, wherein: receiving metadata from the host via the at least one non-data connection into the at least one second register comprises receiving a plurality of metadata comprising first metadata corresponding to a first write operation and second metadata corresponding to a second write operation into the at least one second register, the plurality of metadata corresponding to a plurality of memory addresses of a page of the dynamic random access memory array; and storing the metadata in the second portion of the dynamic random access memory array comprises writing the plurality of metadata into the page of the dynamic random access memory array from the at least one second register to complete the first write operation and the second write operation.

15. The method of claim 11, wherein the metadata comprises an error correction code (ECC).

16. The method of claim 11, wherein the metadata comprises a signature for authenticating the data corresponding to the metadata.

17. The method of claim 11, wherein the at least one non-data connection comprises a data mask inversion (DMI) portion of a channel, wherein a number of connections of the data mask inversion (DMI) portion is less than a number of connections of the at least one data connection.

18. The method of claim 11, wherein the at least one non-data connection comprises a read data strobe (RDQS) portion of a channel, wherein a number of connections of the read data strobe (RDQS) portion is less than a number of connections of the at least one data connection.

19. The method of claim 11, wherein: at least one second register comprises a first portion associated with a first column address and a second portion associated with a second column address, and receiving the metadata comprises receiving the metadata into the first portion or the second portion based on a memory address for the data associated with the metadata specified by a write command corresponding to the data.

20. The method of claim 11, wherein: the at least one second register comprises a first portion and a second portion, and receiving the metadata comprises receiving the metadata into the first portion or the second portion based on an indicator specified by a write command.

21. A memory device, comprising: a dynamic random access memory array comprising a first portion and a second portion; a memory I/O module: coupled to the dynamic random access memory array; configured to communicate with a host through a channel comprising a plurality of connections including at least one data connection and at least one non-data connection; and comprised of at least one first register and at least one second register, the memory I/O module further configured to perform operations comprising: retrieving data from the first portion of the dynamic random access memory array into the at least one first register; retrieving metadata from the second portion of the dynamic random access memory array into the at least one second register; transmitting the data to the host via the at least one data connection from the at least one first register;

and transmitting the metadata to the host via the at least one non-data connection from the at least one second register based on a memory address for the data associated with the metadata specified by a read command received by the memory I/O module corresponding to the data.

22. The memory device of claim 21, wherein the data and the metadata are retrieved simultaneously during a single read command.

23. The memory device of claim 21, wherein the memory I/O module is further configured for performing operations comprising: receiving a first address through at least one second non-data connection corresponding to the data, wherein: retrieving the data from the first portion of the dynamic random access memory array is based on the first address; and retrieving the metadata from the second portion of the dynamic random access memory array is from a second address corresponding to the first address.

24. The memory device of claim 21, wherein: retrieving metadata from the second portion of the dynamic random access memory array into the at least one second register comprises retrieving a plurality of metadata comprising first metadata corresponding to a first read operation and second metadata corresponding to a second read operation during a single page operation, the plurality of metadata corresponding to a plurality of memory addresses of a page of the dynamic random access memory array; and transmitting metadata to the host via the at least one non-data connection from the at least one second register comprises transmitting the plurality of metadata.

25. The memory device of claim 21, wherein the metadata comprises an error correction code (ECC).

26. The memory device of claim 21, wherein the metadata comprises a signature for authenticating the data corresponding to the metadata.

27. The memory device of claim 21, wherein the at least one non-data connection comprises a data mask inversion (DMI) portion of the channel, wherein a number of connections of the data mask inversion (DMI) portion is less than a number of connections of the at least one data connection.

28. The memory device of claim 21, wherein the at least one non-data connection comprises a read data strobe (RDQS) portion of the channel, wherein a number of connections of the read data strobe (RDQS) portion is less than a number of connections of the at least one data connection.

29. The memory device of claim 21, wherein: the at least one second register comprises a first portion associated with a first column address and a second portion associated with a second column address, and retrieving the metadata comprises retrieving the metadata into the first portion or the second portion based on a memory address for the data associated with the metadata specified by a read command received by the memory I/O module corresponding to the data.

30. The memory device of claim 21, wherein: the at least one second register comprises a first portion and a second portion, and retrieving the metadata comprises retrieving the metadata into the first portion or the second portion based on an indicator specified by a read command received by the memory I/O module.

31. A method, comprising: retrieving data from a first portion of a dynamic random access memory array into at least one first register; retrieving metadata from a second portion of the dynamic random access memory array into at least one second register; transmitting the data to a host via at least one data connection from the at least one first register; and transmitting the metadata to the host via at least one non-data connection from the at least one second register based on a memory address for the data associated with the metadata specified by a read command corresponding to the data.

32. The method of claim 31, wherein the data and the metadata are retrieved simultaneously during a single read command.

33. The method of claim 31, further comprising: receiving a first address through at least one second non-data connection corresponding to the data, wherein: retrieving the data from the first portion of the dynamic random access memory array is based on the first address; and retrieving the metadata from the second portion of the dynamic random access memory array is from a second address corresponding to the first address.

34. The method of claim 31, wherein: retrieving metadata from the second portion of the dynamic random access memory array into the at least one second register comprises retrieving a plurality of metadata comprising first metadata corresponding to a first read operation and second metadata corresponding to a second read operation during a single page operation, the plurality of metadata corresponding to a plurality of memory addresses of a page of the dynamic random access memory array; and transmitting metadata to the host via the at least one non-data connection from the at least one second register comprises transmitting the plurality of metadata.

35. The method of claim 31, wherein the metadata comprises an error correction code (ECC).

36. The method of claim 31, wherein the metadata comprises a signature for authenticating the data corresponding to the metadata.

37. The method of claim 31, wherein the at least one non-data connection comprises a data mask inversion (DMI) portion of a channel, wherein a number of connections of the data mask inversion (DMI) portion is less than a number of connections of the at least one data connection.

38. The method of claim 31, wherein the at least one non-data connection comprises a read data strobe (RDQS) portion of a channel, wherein a number of connections of the read data strobe (RDQS) portion is less than a number of connections of the at least one data connection.

39. The method of claim 31, wherein: the at least one second register comprises a first portion associated with a first column address and a second portion associated with a second column address, and retrieving the metadata comprises retrieving the metadata into the first portion or the second portion based on a memory address for the data associated with the metadata specified by a read command corresponding to the data.

40. The method of claim 31, wherein: the at least one second register comprises a first portion and a second portion, and retrieving the metadata comprises retrieving the metadata into the first portion or the second portion based on an indicator specified by a read command.

41. An apparatus, comprising: a host device configured to communicate with a memory device through a channel, wherein the memory device comprises a dynamic random access memory array, the host device comprising a memory controller coupled to the channel, the memory controller configured perform operations including: transmitting data between the memory controller and at least one first register of the memory device through at least one data connection of the channel; and] transmitting metadata between the memory controller and at least one second register of the memory device through at least one non-data connection of the channel; and signaling a read command on the channel specifying at least one read address for retrieving the data and retrieving the metadata from the memory device, wherein the at least one read address identifies a set of the at least one second register for storing the metadata.

42. The apparatus of claim 41, wherein the read command comprises an indicator specifying a set of the at least one second register for storing the metadata.

43. An apparatus, comprising: a host device configured to communicate with a memory device through a channel, wherein the memory device comprises a dynamic random access memory array, the host device comprising a memory controller coupled to the channel, the memory controller configured perform operations including: transmitting data between the memory controller and at least one first register of the memory device through at least one data connection of the channel; transmitting metadata between the memory controller and at least one second register of the memory device through at least one non-data connection of the channel; and signaling a write command on the channel specifying a write address for storing the data and transmitting the data to the memory device, wherein the write address identifies a set of the at least one second register for storing the metadata.

44. The apparatus of claim 43, wherein the write command comprises an indicator specifying one of the at least one second register for storing the metadata.

45. A method, comprising: transmitting, by a memory controller of a host device coupled to a memory device by a channel, data to at least one first register of the memory device through at least one data connection of the channel wherein the memory device comprises a dynamic random access memory array; transmitting, by the memory controller of the host device, metadata to at least one second register of the memory device through at least one non-data connection of the channel; and signaling, by the memory controller, a read command on the channel specifying a read address for retrieving the data and retrieving the metadata from the memory device, wherein the read address identifies a set of the at least one second register for storing the metadata.

46. The method of claim 45, wherein the read address identifies a set of the at least one second register for storing the metadata.

47. The method of claim 45, wherein the read command comprises an indicator specifying a set of the at least one second register for storing the metadata.

48. A method, comprising: transmitting, by a memory controller of a host device coupled to a memory device by a channel, data to at least one first register of the memory device through at least one data connection of the channel, wherein the memory device comprises a dynamic random access memory array; transmitting, by the memory controller of the host device, metadata to at least one second register of the memory device through at least one non-data connection of the channel; and signaling a write command on the channel specifying a write address for storing the data and transmitting the data to the memory device; wherein the write address identifies a set of the at least one second register for storing the metadata.

49. The method of claim 48, wherein the write command comprises an indicator specifying one of the at least one second register for storing the metadata.

* * * * *